United States Patent [19]

Annis

[11] 4,349,739
[45] Sep. 14, 1982

[54] MICRO-CALCIFICATION DETECTION

[75] Inventor: Martin Annis, Cambridge, Mass.

[73] Assignee: American Science and Engineering, Inc., Cambridge, Mass.

[21] Appl. No.: 172,885

[22] Filed: Jul. 28, 1980

[51] Int. Cl.³ .......................... A61B 6/00; H04N 7/18
[52] U.S. Cl. ...................................... 378/99; 250/369; 358/106; 358/111
[58] Field of Search .................. 250/416 TV, 369; 358/111, 106

[56] References Cited

U.S. PATENT DOCUMENTS

| Re. 28,544 | 9/1975 | Stein et al. | 250/369 |
| 3,030,442 | 4/1962 | Brandle et al. | 250/416 TV |
| 3,958,078 | 5/1976 | Fowler | 358/106 |

*Primary Examiner*—Alfred E. Smith
*Assistant Examiner*—Thomas N. Grigsby
*Attorney, Agent, or Firm*—Pollock, Vande Sande and Priddy

[57] ABSTRACT

The detector signal in an X-ray scanning system is electronically analyzed; when the system resolves an object too small to be visualized when displayed in a standard shadowgraphic format on a cathode ray tube, a generated marker appears on the cathode ray tube display representative of the object's location and size/density.

14 Claims, 7 Drawing Figures

U.S. Patent   Sep. 14, 1982   Sheet 1 of 2   4,349,739
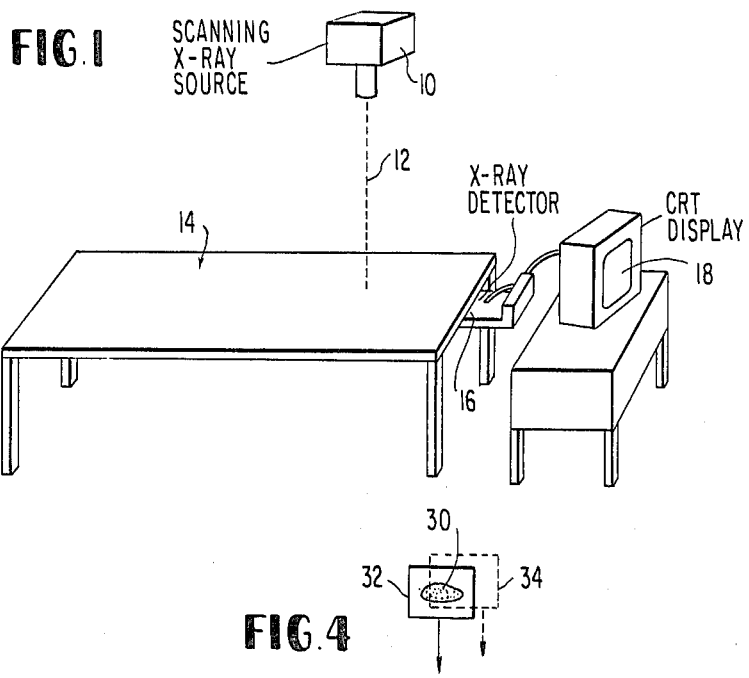
FIG.1
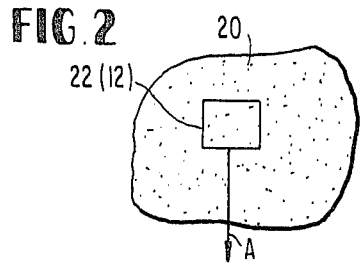
FIG.2
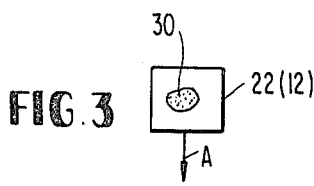
FIG.3
FIG.4
FIG.5
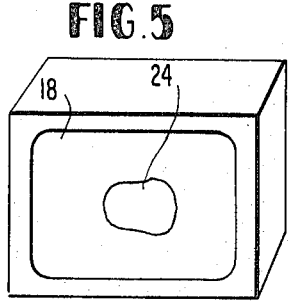
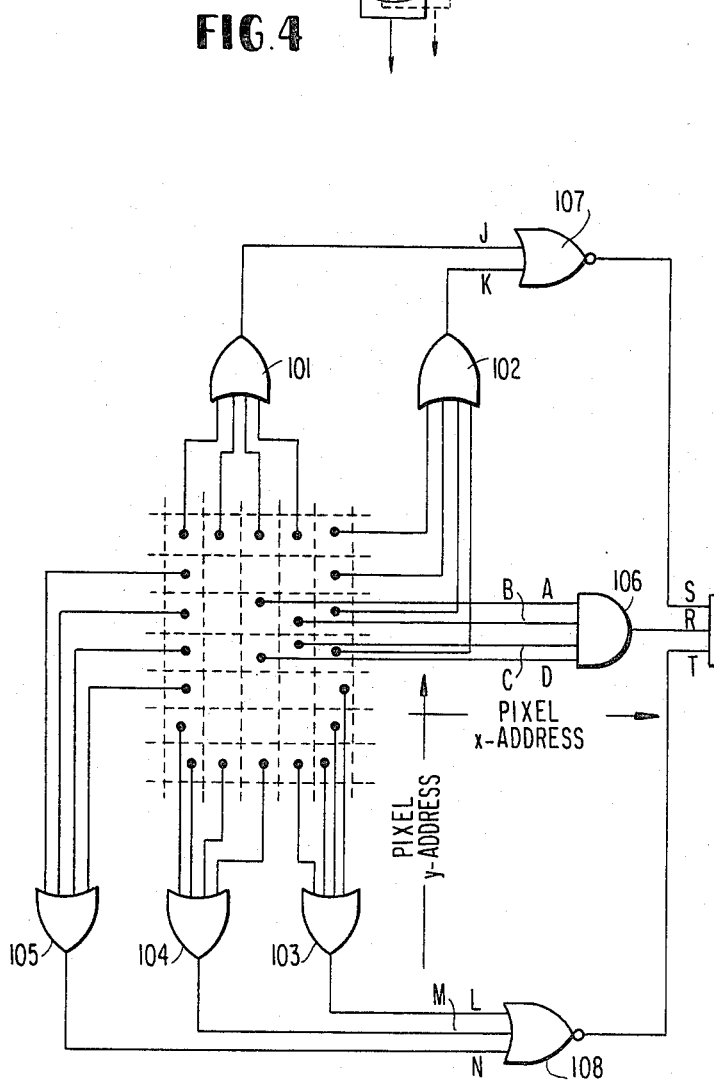
FIG.7

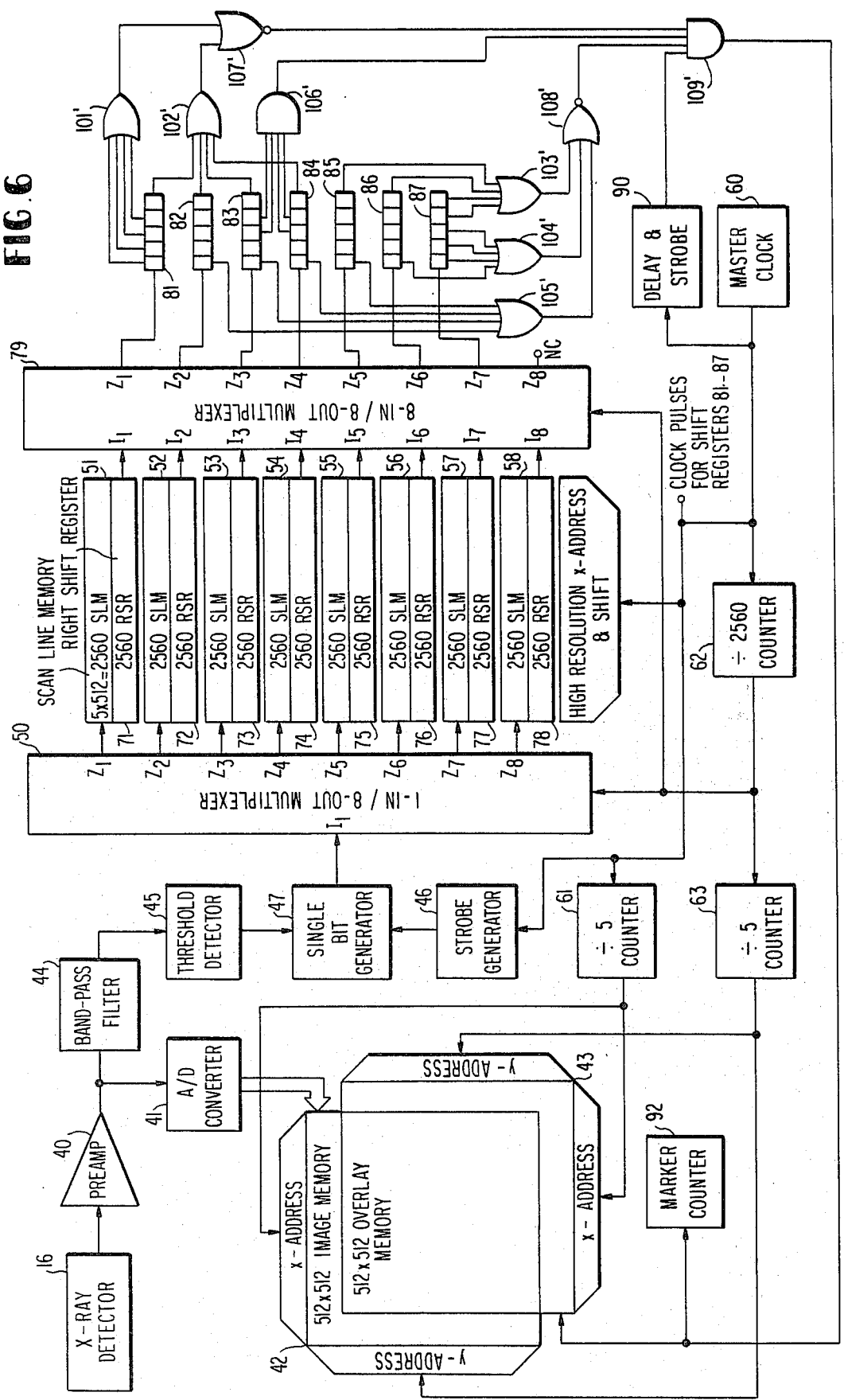

MICRO-CALCIFICATION DETECTION

BACKGROUND OF THE INVENTION

The invention relates in general to radiant energy imaging systems, and in particular to X-ray scanning systems in which an X-ray beam or X-ray fan scans a subject for purposes of producing a cathode ray tube display.

One important advance in X-ray technology in recent years has been the development of X-ray scanning systems. A narrow X-ray beam or X-ray fan scans a subject quickly, so that the radiant energy falling on the subject is minimal. The scanning technique lends itself to use of a cathode ray picture tube for generation of an image from the signal created by the detector of the X-ray beam. Such a system is described, for example, in Stein et al U.S. Pat. No. Re. 28,544 for "Radiant Energy Imaging With Scanning Pencil Beam" (originally U.S. Pat. No. 3,780,291, issued Dec. 18, 1973).

The use of the generated image is limited by the capacity of the X-ray beam or fan detector and display system to reveal minute objects in the subject as readily discernible objects in the display.

Accordingly, it is an object of this invention to overcome the limitations of resolution of typical X-ray scanning systems in the detection of minute objects of a subject. It is another object of the invention to provide a method and apparatus for indicating the presence of such minute objects. It is a further object of the invention to achieve these results with an apparatus that is simple and reliable, and with a method that allows maximum use of the capacities of the X-ray scanning system.

SUMMARY OF THE INVENTION

The present invention comprises a novel method and apparatus for use with an X-ray scanning system of the type comprising an X-ray beam or X-ray fan source for scanning a subject with an X-ray beam or X-ray fan of a given cross-section, a detector for detecting changes in the intensity of the X-ray beam, or a linear array of detectors for detecting changes in the intensity of the X-ray fan and a visual display created by the resolution of detected changes in X-ray intensity into picture elements. The novel method of the present invention indicates the presence of objects in the subject too small for satisfactory visual resolution into picture elements by the steps of electronically analyzing the detector signal for X-ray intensity changes attributable to the minute objects, and generating a visible marker on the visual display when such a minute object is electronically resolved. Preferably, the marker is generated on the visual display at a location corresponding to the location of the minute object in the subject. The marker is preferably a noticeable dot whose intensity is a function of the magnitude of the change in detected X-ray intensity; the marker is made as small as is possible, such as utilizing only one picture element of the visual display.

The step of analyzing the detector signal preferably comprises measuring the detected X-ray intensity corresponding to successive picture elements, and comparing them. When the method is implemented in an X-ray scanning system in which each point of the subject is traversed at least twice by an X-ray beam, or sampled at least twice while being swept by an X-ray fan, the method may further include the step of erasing from the visual display any marker generated only once in two successive traversals by the X-ray beam, or in two successive samplings of the X-ray fan. The method may also include the step of storing the information for the generation of markers.

The apparatus of the present invention comprises means for electronically analyzing the detector signal for X-ray beam changes attributable to minute objects, and means for generating a visible marker on the visual display in response to the signal analyzer means.

Numerous other features, objects and advantages of the invention will become apparent from the following specification when read in connection with the accompanying drawings in which:

BRIEF DESCRIPTION OF THE DRAWINGS

FIG. 1 is a pictorial representation of an X-ray scanning system including apparatus embodying the invention;

FIG. 2 depicts an object which is large enough to be resolved into picture elements in the system;

FIG. 3 depicts an object which is too small to be resolved into a picture element;

FIG. 4 depicts the object shown in FIG. 3, and the paths of successive traversals of the X-ray beam;

FIG. 5 depicts the object of FIG. 2 resolved into picture elements on a portion of a cathode ray tube display;

FIG. 6 is a schematic representation of a preferred embodiment of the invention; and FIG. 7 is a schematic representation of the pattern recognition scheme used in the embodiment of FIG. 6.

DETAILED DESCRIPTION OF PREFERRED EMBODIMENTS

The major elements of an X-ray scanning system are shown in FIG. 1. The system includes an X-ray beam source 10 for directing an X-ray beam 12 at the table 14 below. Beam 12 will scan a subject on the table 14, traversing a line and then another line displaced from the first one. Successive traversals will overlap, so that every point on the subject is traversed at least twice, and perhaps more, by the beam 12.

Underneath table 14 is an elongated X-ray detector 16, which moves in such a manner as to intercept each of he complete traversals of X-ray beam 12 as it scans a subject on table 14. The changes in intensity of the X-ray beam 12 incident upon detector 16 are resolved into picture elements appearing on the cathode ray tube display.

More detail about how such a system is created and how it functions may be found in the above-mentioned U.S. Pat. No. Re. 28,544 which is incorporated herein by reference, but the system will be described hereinafter to the extent necessary to understand the present invention.

Briefly, when the subject being scanned on table 14 is, for example, a human breast, the objective of using such a system would be to detect calcifications in the breast tissue. Such a calcification is shown in FIG. 2. The cross-sectional dimensions of the X-ray beam 12 are shown superimposed on the calcification 20 as an outline 22, and the arrow A shows the direction of motion of beam 12 as it traverses calcification 20. When the calcification is sufficiently large (e.g., as shown in FIG. 2) in relation to the cross-section of the X-ray beam 12, a signal from detector 16 is transmitted to cathode ray tube 18 to effect a picture element there, and the signal will continue for several picture elements on one traversal, and more on the next, so that a visual presentation 24 of calcification 20 will appear on a portion of cathode ray tube display 18, as shown in FIG. 5.

There may, however, be an object in the breast tissue, such as a micro-calcification, that absorbs X-rays more than the surrounding breast tissue and yet is smaller in size than the resolution capability of the X-ray system. Ordinarily, such a micro-calcification would appear on the display 18 as a brightened picture element, the increased brightness of which is a function of the *density* × *depth* of the micro-calcification; but this increased brightness is often insufficient to visually indicate the presence or location of such a minute object.

FIG. 3 shows such a micro-calcification 30, and its relative size by a superimposition of the cross-section 22 of X-ray beam 12. The arrow A again indicates the direction of motion of the beam 12 during a scan. With an object of this relatively small size, the signal from detector 16 will first fall by a small amount and then rise by the same small amount in a time which corresponds to the movement of the X-ray beam 12 of less than twice the cross-sectional dimension of X-ray beam 12. If the signal falls but does not rise to the original value in this time, it signifies that the object has been satisfactorily resolved by the system, as in FIG. 5.

When such satisfactory resolution into a picture element is not possible, however, an analyzer circuit is, in accordance with the present invention, introduced to monitor the detector signal. The analyzer circuit detects the small fall and rise of the detector signal; if the temporal duration of the negative pulse is characteristic of the X-ray beam sweeping across a micro-calcification, say in the x-direction, this signature is temporarily recorded with the corresponding x-address. If several sweeps of the X-ray beam across the same location indicate a micro-calcification as opposed to statistical fluctuations in the signal, a marker generator is triggered which then records the signature with the corresponding (x, y) address. Thus, referring to FIG. 4, the micro-calcification 30 is again shown with the cross-section 32 from one traversal by X-ray beam 12 superimposed thereon, and a cross-section 34 from a second transversal of the X-ray beam is also shown superimposed thereon. For such relative dimensions, the micro-calcification 30 could possibly be detected by the analyzer circuit of the present invention in five consecutive traversals.

The recording of each marker generator signature and address is used to establish a visual marker on the cathode ray tube at the corresponding display location of each detected micro-calcification. The visual markers are made as small as is possible so as not to mask the overall radiographic display, but are bright enough to be easily visible to the viewer of the display. Additional circuitry can be provided so that the displayed brightness of each marker is a function of the increase in attenuation of the X-ray beam 12 while traversing the corresponding micro-calcification. Further circuitry can be provided so that all display markers can be turned on or off at will, or even allowed to blink.

FIG. 6 is a functional diagram of the standard means employed for storing a two-dimensional image from a single detector, but with the addition of an analyzer circuit and marker generator, in accordance with the present invention, for creating micro-calcification markers on the two-dimensional displayed image. The standard portion of the system consists of an X-ray detector 16 whose signal is amplified by preamp 40, converted to a digital signal by the analog-to-digital converter 41, and appropriately stored in an image memory 42; the memory system also includes an overlay memory 43, commonly used to insert alphanumerics on the image. The remainder of the circuit shown in FIG. 6 comprises the present invention, described above and to be described in further detail hereinafter.

In addition to being digitized, the detector's amplified signal from preamp 40 is directed through a bandpass filter 44. The filter 44 is of conventional design to pass only a narrow band of frequencies representative of pulses which could have been due to the sweep of the X-ray pencil beam 12 across a micro-calcification. If the cross-sectional width of the beam is designated w, and the sweep speed of the beam is designated v, pulse width time intervals less than w/v are rejected since this boundary represents the time required for the beam to sweep a point; all narrower pulse widths would be considered as noise. The other boundary could be chosen to be 2w/v since this is the time interval required for all of the beam to sweep a distance of w; wider pulse widths would be considered visible without the aid of the marker generator. Thus only the intermediate band of pulse widths can pass through the filter 44 with little attenuation, to be detected by the threshold detector 45. If the signal is above the specified threshold at the time a strobe command arrives from strobe generator 46, a logic "1" is generated by the single bit generator 47; if the signal is below threshold, a logic "0" is generated.

The circuit described immediately above generates candidate micro-calcification markers. However, an output from this circuit will also occur due to noise spikes of the proper pulse width, or from a thin line of attenuation running nonparallel to the sweep of the X-ray pencil beam. Thus these candidate markers must be further analyzed. Although a variety of methods can be used to analyze the candidate markers, it is normally necessary to first temporarily store the incoming data in one or several scan line memories. The number of elements in each array should be large enough so that the representative dwell time for each element is w/v; the smallest pulse width time interval boundary (high frequency limit) of the bandpass filter 44. Thus this limited number of scan line memories represents a small portion of a high resolution memory.

Continuing the discussion of FIG. 6, single bit data from bit generator 47 are routed through a multiplexer 50 to a scan line memory, selected from the octal set of scan line memories 51 through 58. In this example, the scan line memories 51-58 have a resolution in the x-direction which is five times the resolution of the memories 42 and 43. This is implemented by applying the high frequency pulses from a master clock 60 to all eight scan line memories for x-addressing, and by dividing this frequency by five in a divider 61 before x-addressing memories 42 and 43. If each X-ray pencil beam sweep is recorded in a different scan memory due to divider 62, and five sweeps are added and recorded in the image memory 42, where the image y-address advance is implemented by divider 63, then the scan line memories also have a resolution in the y-direction which is five times the resolution of the image memory. The method of adding five sweeps of scan data per line of pixels within memory 42 is a standard technique, independent of the invention and therefore not shown.

After eight sweeps of the X-ray beam, each recorded in a different scan line memory, the data from the ninth sweep will overwrite the data from the first sweep.

Thus this temporary data must be analyzed sometime before they are destroyed. There are several methods of analysis, but most of them cannot properly interpret a thin line of attenuation which is positioned approximately 45° (or 135°) with respect to the direction of the X-ray beam sweeps. The most accurate analysis is by pattern recognition.

FIG. 7 diagrammatically illustrates how a sophisticated pattern recognition scheme can be implemented at a given location in the high resolution memory (scan line memories 51 through 58 in FIG. 6), using only a very simple logic circuit. Shown is a 5 pixel (x-direction) by 7 pixel (y-direction) portion of the said high resolution memory. The logic arrangement comprises five quad OR gates 101–105 whose outputs are designated J, K, L, M and N respectively, one quad AND gate 106 whose inputs are designated A, B, C and D and whose output is designated R, two NOR gates 107 and 108 connected to the OR gates as shown and providing outputs S and T, and a triple AND gate 109 having inputs R, S and T and an output Z. A marker is generated if output Z from the triple AND gate 109 is true (logic "1"). Utilizing Boolean algebra notation for the pattern logic, we have $$Z = R \cdot S \cdot T$$
$$= (A \cdot B \cdot C \cdot D) \cdot \overline{(J + K)} \cdot \overline{(L + M + N)}$$
$$= A \cdot B \cdot C \cdot D \cdot \overline{J} \cdot \overline{K} \cdot \overline{L} \cdot \overline{M} \cdot \overline{N}$$

Thus for Z to be true, a logic "0" must appear at the four memory locations monitored by lines A, B, C, and D, and a logic "0" must appear at all peripheral memory locations shown in FIG. 7. Within this 5×7 boundary of "below threshold" criteria, there are eleven memory locations which are optional; thus there are $2^{11} = 2048$ pattern combinations acceptacle within this 5×7 region of the high resolution memory, since each of the 11 optional positions contains either a logic "0" or a logic "1".

The logic system shown in FIG. 7 is designed so that at least two, but not more than 5, X-ray beam sweeps across a micro-calcification are required, and the pulse duration must be either two or three high-resolution pixels wide. With respect to the low-resolution (image) memory 42, the design allows the micro-calcification to be easily detectable even if it is positioned right-of-center, above-center, or upper-right-of-center of any low-resolution (image) pixel. Other pattern criteria are easily obtainable by some other simple logic combinations.

It is necessary that the 5×7 pixel pattern analysis be moved over the entire high-resolution memory to analyze all data before they are overwritten. One method of accomplishing this is to shift the data from the high-resolution memory into seven 5-element shift registers so that the leads for the five quad OR gates 101–105 and the one quad AND gate 106 do not have to be continuously relocated. Referring again to FIG. 6, this is accomplished by first switching all data from each of the eight 2560-element scan line memories 51 through 58 to adjacent 2560-element shift registers 71 through 78. This occurs at the beginning of each X-ray beam sweep. During this X-ray beam sweep, data are read into one of the scan line memories. Simultaneously at the X-ray beam sweep start, multiplexer 79 is switched so as to direct the data from the shift registers attached to the other seven scan line memories into the seven 5-element shift registers 81 through 87. A single shift occurs for each of the 2560 points along each X-ray pencil beam sweep. For each shift, a pattern analysis is made by the pattern recognition section which consists of the logic circuit previously described in FIG. 7, and shown in FIG. 6 (using prime notations for the corresponding elements shown in FIG. 7) wired to the seven shift registers 81 through 87, plus these seven registers 81 through 87.

The 2560-element shift registers and the 7-element shift registers automatically keep the data sequential in the x-direction as they are shifted through the pattern recognition section. Multiplexer 79 must organize the switching of data that represent complete X-ray scan lines so that they shift through the pattern recognition section sequentially in the y-direction. Multiplexer 79 accomplishes this by causing data representing the X-ray beam scan in progress to appear at its output $Z_8$ (no connection), data representing the most recent completed scan to appear at its output $Z_7$, the next most recent at output $Z_6$, etc; the oldest complete X-ray scan data that is still preserved appears at $Z_1$.

After a fixed delay such that all shift registers and logic circuits have settled at the end of each shift, a strobe from circuit 90 will be generated and applied to the quad AND gate 109'. If one of the 2048 acceptable patterns are recognized, a logic "1" will be generated at the output of gate 109'. This signal will increment marker counter 92, and will be applied at the proper (x, y) address in the overlay memory 43. Note that it is possible to apply as many as 5×5=25 markers to the same (x, y) address. If the overlay memory is 5 bits deep (capable of storing $2^5 = 32$ numbers) and utilizes add-/store registers, the size to the micro-calcifications can be represented by the intensity of the overlaid markers. An additional feature can be supplied by allowing the markers to be turned on or off at will during the viewing of the image, or even allowed to blink.

The function of the micro-calcification analyzer and marker generator shown in FIG. 6 has been described above as it would be used with an X-ray system using a scanning X-ray beam. The frequency limits of bandpass filter 44 are set according to the cross-sectional width of the X-ray beam and the sweep speed of the X-ray beam; also the logic analysis of the seven shift registers 81 through 87 require that the X-ray beam sweeps across the micro-calcification at least two but not more than five times. However, the same circuit shown in FIG. 6 can also be used with an X-ray system using a scanning X-ray fan incident on a linear array of detectors. In this latter case the frequency limits of the bandpass filter 44 are set according to the cross-sectional width of each detector in the linear array and according to the readout speed of the linear array of detectors; also the logic analysis of the seven shift registers 81 through 87 require that at least two but not more than five readouts of the linear array of detectors are made while the X-ray fan sweeps across the micro-calcification.

There have been described novel methods and apparatus for the radiant energy observing of minute objects characterized by simplicity and efficiency. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and methods herein disclosed.

What is claimed is:

1. A micro-calcification detection method for use with an X-ray scanning system of the type comprising an X-ray beam source or X-ray fan source, detector means for detecting changes in the intensity of said X-ray beam or X-ray fan during the X-ray scanning of a subject, and a visual display created by the resolution of detected changes in X-ray intensity into picture elements on said visual display,
   the method being operative to indicate the presence of objects in the subject too small for satisfactory resolution into picture elements on said visual display and comprising the steps of:
   analyzing said detected changes for X-ray intensity changes attributable to said objects, and
   generating a bright dot on said visual display when such a change is found.

2. The method of claim 1 wherein said generating step generates said bright dot on said visual display at a location correspondng to the location of said object in said subject.

3. The method of claim 1 in which the brightness of said dot is a function of the magnitude of said X-ray intensity change.

4. A micro-calcification detection method for use with an X-ray scanning system of the type comprising an X-ray beam source or X-ray fan source, detector means for detecting changes in the intensity of said X-ray beam or X-ray fan during the X-ray scanning of a subject, and a visual display created by the resolution of detected changes in X-ray intensity into picture elements on said visual display,
   the method being operative to indicate the presence of objects in the subject too small for satisfactory resolution into picture elements on said visual display, the visual display size of said object being significantly smaller than one of said picture elements, said method comprising the steps of:
   analyzing said detected changes for X-ray intensity changes attributable to said object, and
   generating a visible marker on said visual display when such a change is found.

5. A micro-calcification detection method for use with an X-ray scanning system of the type comprising an X-ray beam source or X-ray fan source, detector means for detecting changes in the intensity of said X-ray beam or X-ray fan during the X-ray scanning of a subject, and a visual display created by the resolution of detected changes in X-ray intensity into picture elements on said visual display,
   the method being operative to indicate the presence of objects in the subject too small for satisfactory resolution into picture elements on said visual display and comprising the steps of:
   traversing each point of the subject at least twice by said X-ray beam or X-ray fan,
   analyzing said detected changes for X-ray intensity changes attributable to said objects, and
   generating a visible marker on said visual display when such a change is found.

6. A micro-calcification detection method for use with an X-ray scanning system of the type comprising an X-ray source for scanning a subject with an X-ray beam or X-ray fan of a given cross-section, detector means for detecting changes in the intensity of X-rays, and a visual display created by the resolution of detected changes in X-ray intensity into picture elements, in which each point of the subject is traversed at least twice by said X-ray beam or X-ray fan;
   the method of indicating the presence of objects in the subject which are smaller in size than said given cross-section whereby said objects are too small for satisfactory resolution into picture elements in said visual display, comprising the steps of:
   analyzing said detector signal for X-ray intensity changes attributable to said objects, said analyzing step including the steps of measuring and temporarily storing the detected X-ray threshold intensity changes corresponding to successive high resolution elements and comparing them, and
   using the stored information to generate a visible dot on said visual display at a location corresponding to the location of said object in said subject and with a dot brightness which is a function of the magnitude of said X-ray intensity change.

7. In a radiation imaging apparatus of a type wherein a beam of high energy radiation irradiates a target object and associated radiation detector means generates electrical detector signals corresponding to the intensity of the attenuated radiation that emerges from the target object, the signals being used to form a visual display of the changes in the intensity of the attenuated radiation over resolution areas of said target object, the improvement comprising:
   means for generating electrical detector signals corresponding to the intensity of said attenuated radiation over successive adjacent minimum resolution areas along scan lines of said target object and creating corresponding visible picture elements to form line images of said scan lines;
   imaging memory means for storing said line images;
   means for displaying the stored line images to form a composite image of the changes of intensity of said attenuated radiation over said target object;
   filter means for selecting sub-resolution electrical detector signals associated with radiation intensity changes attributable to sub-resolution target body areas smaller than said minimum resolution area;
   means for sampling successive portions of each of said sub-resolution signals and generating a corresponding pixel signal for each portion;
   pixel store means for storing the pixel signals generated over a plurality of said scan lines;
   means for analyzing successive array portions of the pixel signals stored in said pixel store means, including means for generating a marker signal when a particular pattern of the pixel signals in an array portion is recognized; and
   means for counting the marker signals generated for the pixel array portions associated with each of said sub-resolution areas and displaying a marker image at positions in said composite image corresponding to the positions of the associated sub-resolution areas in said target body, said marker images each having an intensity corresponding to the magnitude of the radiation intensity change over the associated sub-resolution area.

8. The imaging apparatus of claim 7 wherein said imaging memory means includes a digital storage device having unit storage positions corresponding to said visible picture elements.

9. The imaging apparatus of claim 7 wherein said filter means includes means for receiving the detector signals generated by said radiation detectors and passing only signals having a duration less than the scan time required to measure the attenuated radiation across said minimum resolution area and greater than the scan time required to measure the attenuated radiation from a point.

10. The imaging apparatus of claim 9 including means for generating a pencil beam of high energy radiation having a width defining said minimum resolution area and a scan time determined by the rate of the relative line scanning movement between said pencil beam and said detectors.

11. The imaging apparatus of claim 9 including means for generating a fan beam of high energy radiation for irradiating an array of detectors along a scan line, the minimum resolution area being defined by the resolution of individual detectors in the scan line and the scan time defined by the rate for reading the detector signals from the detectors in the scan line.

12. The imaging apparatus of claim 7 wherein said pixel store means includes a digital storage device having unit storage positions, each unit storage position corresponding to a portion of a sub-resolution signal.

13. The imaging apparatus of claim 12 wherein said sampling means includes means for sampling N equal portions of each sub-resolution signal and generating corresponding lines of pixel signals, the pixel signals for each sub-resolution signal being stored in corresponding unit storage positions of said pixel store means; N being an integer greater than one.

14. The imaging apparatus of claim 13 wherein N is at least 5.

* * * * *